United States Patent
Hagiwara et al.

(10) Patent No.: US 10,480,052 B2
(45) Date of Patent: Nov. 19, 2019

(54) PERMANENT MAGNET, AND MOTOR AND GENERATOR USING THE SAME

(71) Applicants: KABUSHIKI KAISHA TOSHIBA, Minato-ku, Tokyo (JP); TOSHIBA MATERIALS CO., LTD., Yokohama-shi, Kanagawa (JP)

(72) Inventors: Masaya Hagiwara, Yokohama Kanagawa (JP); Shinya Sakurada, Shinagawa Tokyo (JP); Yosuke Horiuchi, Minato Tokyo (JP); Tadahiko Kobayashi, Yokohama Kanagawa (JP); Tsuyoshi Kobayashi, Kawasaki Kanagawa (JP); Masaki Endo, Minato Tokyo (JP); Naoyuki Sanada, Yokohama Kanagawa (JP); Masami Okamura, Yokohama Kanagawa (JP); Takao Sawa, Yokohama Kanagawa (JP); Keiichi Fuse, Yokohama Kanagawa (JP); Satoru Habu, Yokohama Kanagawa (JP)

(73) Assignees: KABUSHIKI KAISHA TOSHIBA, Tokyo (JP); TOSHIBA MATERIALS CO., LTD., Yokohama-shi (JP)

( * ) Notice: Subject to any disclaimer, the term of this patent is extended or adjusted under 35 U.S.C. 154(b) by 156 days.

(21) Appl. No.: 15/253,945

(22) Filed: Sep. 1, 2016

(65) Prior Publication Data
US 2017/0002445 A1 Jan. 5, 2017

Related U.S. Application Data

(63) Continuation of application No. PCT/JP2015/001427, filed on Mar. 14, 2015.

(30) Foreign Application Priority Data

Mar. 19, 2014 (JP) .................. 2014-056428

(51) Int. Cl.
*H01F 1/055* (2006.01)
*C22C 30/02* (2006.01)
(Continued)

(52) U.S. Cl.
CPC .............. *C22C 30/02* (2013.01); *B22F 5/00* (2013.01); *C22C 1/0441* (2013.01); *C22C 19/07* (2013.01);
(Continued)

(58) Field of Classification Search
None
See application file for complete search history.

(56) References Cited

U.S. PATENT DOCUMENTS

| | | | |
|---|---|---|---|
| 4,746,378 A | 5/1988 | Wysiekierski et al. |
| 6,565,673 B1 | 5/2003 | Gong et al. |

(Continued)

FOREIGN PATENT DOCUMENTS

| | | |
|---|---|---|
| CN | 1325535 | 12/2001 |
| EP | 1 127 358 | 8/2001 |

(Continued)

OTHER PUBLICATIONS

Machine translation of JP2002-015910A. (Year: 2002).*
(Continued)

*Primary Examiner* — Xiaowei Su
(74) *Attorney, Agent, or Firm* — Amin, Turocy & Watson LLP

(57) ABSTRACT

A permanent magnet of the embodiment includes: a composition represented by a composition formula: $R(Fe_pM_qCu_rC_tCo_{1-p-q-r-t})_z$ (R is at least one element selected from
(Continued)

rare-earth elements, M is at least one element selected from Ti, Zr and Hf, $0.27 \leq p \leq 0.45$, $0.01 \leq q \leq 0.05$, $0.01 \leq r \leq 0.1$, $0.002 \leq t \leq 0.03$, and $6 \leq z \leq 9$); and a metallic structure including a main phase containing a $Th_2Zn_{17}$ crystal phase, and a sub phase of the element M having an element M concentration of 30 atomic % or more. The sub phase of the element M precipitates in the metallic structure. A ratio of a circumferential length to a precipitated area of the sub phase of the element M is 1 or more and 10 or less.

13 Claims, 3 Drawing Sheets

(51) Int. Cl.

| | | |
|---|---|---|
| *C22C 19/07* | (2006.01) | |
| *C22C 1/04* | (2006.01) | |
| *C22C 21/06* | (2006.01) | |
| *H02K 1/02* | (2006.01) | |
| *B22F 5/00* | (2006.01) | |
| *H01F 1/053* | (2006.01) | |
| *H01F 1/08* | (2006.01) | |
| *H01F 1/059* | (2006.01) | |
| *H01F 7/02* | (2006.01) | |

(52) U.S. Cl.
CPC ........... *C22C 21/06* (2013.01); *H01F 1/0536* (2013.01); *H01F 1/0557* (2013.01); *H01F 1/086* (2013.01); *H02K 1/02* (2013.01); *C22C 2202/02* (2013.01); *H01F 1/0596* (2013.01); *H01F 7/0226* (2013.01)

(56) References Cited

U.S. PATENT DOCUMENTS

| | | |
|---|---|---|
| 2006/0137767 A1 | 6/2006 | Yamamoto et al. |
| 2012/0242180 A1 | 9/2012 | Horiuchi et al. |

FOREIGN PATENT DOCUMENTS

| | | |
|---|---|---|
| JP | 60-238463 | 11/1985 |
| JP | 60-254707 | 12/1985 |
| JP | 63-149362 | 6/1988 |
| JP | 1-179302 | 7/1989 |
| JP | 5-25592 | 2/1993 |
| JP | 6-322466 | 11/1994 |
| JP | 2002-15910 | 1/2002 |
| JP | 2002-529593 | 9/2002 |
| JP | 2006-210893 | 8/2006 |
| JP | 2012-204599 | 10/2012 |
| JP | 2013-138258 | 7/2013 |
| WO | 00/26926 | 5/2000 |

OTHER PUBLICATIONS

Liu et al. (IEEE Transactions on Magnetics, 1989, vol. 25, p. 3785-3787). (Year: 1989).*
International Preliminary Report on Patentability for International Patent Application No. PCT/JP2015/001427 dated Sep. 20, 2016, 8 pages.
Extended European Search Report for European Patent Application No. 15764814.8 dated Oct. 26, 2017, 5 Pages.
International Search Report for International Patent Application No. PCT/JP2015/001427 dated May 26, 2015, 5 pages.
Written Opinion for International Patent Application No. PCT/JP2015/001427 dated May 26, 2015, 5 pages.

* cited by examiner

PERMANENT MAGNET, AND MOTOR AND GENERATOR USING THE SAME

CROSS-REFERENCE TO RELATED APPLICATIONS

This application is a continuation of prior International Application No. PCT/JP2015/001427 filed on Mar. 14, 2015, which is based upon and claims the benefit of priority from Japanese Patent Application No. 2014-056428 filed on Mar. 19, 2014; the entire contents of all of which are incorporated herein by reference.

TECHNICAL FIELD

Embodiments described herein relate generally to a permanent magnet, and a motor and a generator using the same.

BACKGROUND

As a high-performance permanent magnet, rare-earth magnets such as an Sm—Co based magnet and an Nd—Fe—B based magnet are known. When a permanent magnet is used in a motor for a hybrid electric vehicle (HEV), electric vehicle (EV), railway vehicle, and so on, it is demanded for the permanent magnet to have heat resistance. In motors for HEV, EV, railway vehicle, and so on, the permanent magnet whose heat resistance is increased by replacing a part of Nd (neodymium) of the Nd—Fe—B based magnet with Dy (dysprosium) is used. Dy is one of rare elements, and thus a permanent magnet not using Dy is demanded.

The Sm—Co based magnet has a high Curie temperature and thus is known to exert excellent heat resistance as a composition system not using Dy, and is expected to achieve favorable operating characteristics at a high temperature. The Sm—Co based magnet is low in magnetization compared to the Nd—Fe—B based magnet, and is not able to achieve a sufficient value of maximum magnetization energy product ($(BH)_{max}$). In order to increase magnetization of the Sm—Co based magnet, it is effective to replace a part of Co with Fe, and increase Fe concentration. However, coercive force of the Sm—Co based magnet tends to decrease in a composition region with high Fe concentration. Accordingly, there is demanded a technology to enable exertion of large coercive force while keeping high magnetization in the Sm—Co based magnet having a composition with high Fe concentration.

DETAILED DESCRIPTION

Figure 1:
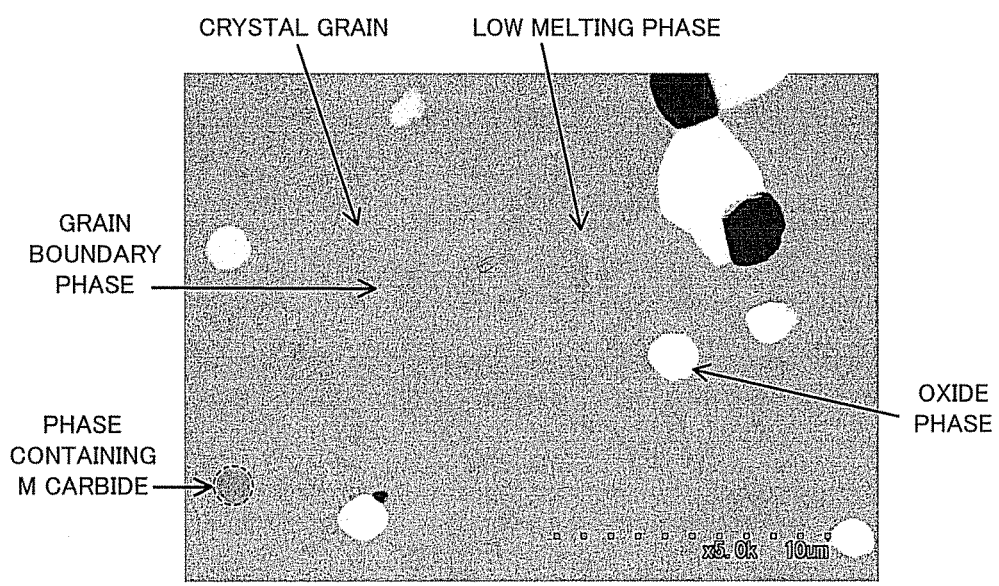
FIG. 1 is a scanning electron microscope image enlargedly illustrating a metallic structure of a permanent magnet of an embodiment.

Hereinafter, a permanent magnet of an embodiment will be described. The permanent magnet of the embodiment has a composition represented by:

a composition formula: $R(Fe_pM_qCu_rC_tCo_{1-p-q-r-t})_z$ (1)

wherein R is at least one element selected from the group consisting of rare-earth elements, M is at least one element selected from the group consisting of Ti, Zr and Hf, p is a number (atomic ratio) satisfying $0.27 \leq p \leq 0.45$, q is a number (atomic ratio) satisfying $0.01 \leq q \leq 0.05$, r is a number (atomic ratio) satisfying $0.01 \leq r \leq 0.1$, t is a number (atomic ratio) satisfying $0.002 \leq t \leq 0.03$, and z is a number (atomic ratio) satisfying $6 \leq z \leq 9$; and a metallic structure including a main phase containing a $Th_2Zn_{17}$ crystal phase, and a sub phase of the element M having an element M concentration of 30 atomic % or more. In the permanent magnet of the embodiment, the sub phase precipitates in the metallic structure, and a ratio of a circumferential length to a precipitated area of the sub phase is 1 or more and 10 or less.

In the composition formula (1), as the element R, at least one element selected from rare-earth elements including yttrium (Y) is used. Any of the elements R brings about great magnetic anisotropy and gives a high coercive force to the permanent magnet. As the element R, at least one element selected from samarium (Sm), cerium (Ce), neodymium (Nd), and praseodymium (Pr) is preferably used, and the use of Sm is especially desirable. When 50 atomic % or more of the element R is set to Sm, it is possible to enhance performances, especially the coercive force of the permanent magnet. Further, 70 atomic % or more of the element R is desirably Sm.

The element R is contained such that an atomic ratio of the element R to elements other than the element R (Fe, Co, M, Cu, C) falls in a range of 1:6 to 1:9 (the z value falls in a range of 6 to 9). When an atomic ratio z of the element R to the elements other than the element R exceeds 9, a lot of a-Fe phases precipitate, and sufficient coercive force cannot be obtained. When the atomic ratio z is less than 6, saturation magnetization decreases significantly. The atomic ratio z is preferably 6.5 or more, and more preferably 7 or more. Further, the atomic ratio z is preferably 8.5 or less, and more preferably 8 or less.

Iron (Fe) is an element mainly responsible for the magnetization of the permanent magnet. When a large amount of Fe is contained, it becomes possible to increase the saturation magnetization of the permanent magnet. However, when an excessively large amount of Fe is contained, the coercive force may decrease because of precipitation of the a-Fe phase or the like. The content of Fe falls in a range of $0.27 \leq p \leq 0.45$ in the atomic ratio when a total amount of elements other than the element R (Fe, Co, Cu, M, C) is set to 1. The content of Fe is more preferably $0.29 \leq p \leq 0.43$, and still more preferably $0.30 \leq p \leq 0.40$.

As the element M, at least one element selected from titanium (Ti), zirconium (Zr), and hafnium (Hf) is used. When the element M is contained, a large coercive force can be exerted by a composition with high Fe concentration. The content of the element M falls in a range of $0.01 \leq q \leq 0.05$ in the atomic ratio when the total amount of elements other than the element R (Fe, Co, Cu, M, C) is set to 1. When a q value exceeds 0.05, the magnetization decreases significantly. When the q value is less than 0.01, an effect of increasing the Fe concentration is small. The content of the element M is more preferably $0.012 \leq q \leq 0.03$, and still more preferably $0.015 \leq q \leq 0.025$.

Although the element M may be any one of Ti, Zr and Hf, it preferably contains at least Zr. In particular, when 50 atomic % or more of the element M is set to Zr, it is possible to further improve the effect of increasing the coercive force of the permanent magnet. Hf is particularly expensive in the element M, and therefore, even when Hf is used, the amount of Hf used is preferably small. The content of Hf is preferably set to less than 20 atomic % of the element M.

Copper (Cu) is an element for enabling the permanent magnet to exert the high coercive force. The content of Cu falls in a range of $0.01 \leq r \leq 0.1$ in the atomic ratio when the total amount of elements other than the element R (Fe, Co, Cu, M, C) is set to 1. When an r value exceeds 0.1, the magnetization decreases significantly. When the r value is less than 0.01, it becomes difficult to obtain the high coercive force. The content of Cu is more preferably $0.02 \leq r \leq 0.1$, and still more preferably $0.03 \leq r \leq 0.08$.

Cobalt (Co) is an element responsible for the magnetization of the permanent magnet and necessary for enabling exertion of the high coercive force. When a large amount of Co is contained, the Curie temperature becomes high, and thermal stability of the permanent magnet improves. When the content of Co is too small, these effects cannot be obtained sufficiently. However, when the content of Co is too large, the content of Fe decreases relatively, and there is a possibility to cause a lowering of magnetization. The content of Co is set in a range $(1-p-q-r-t)$ defined by p, q, r, t.

A part of Co may be replaced with at least one element A selected from nickel (Ni), vanadium (V), chrome (Cr), manganese (Mn), aluminum (Al), silicon (Si), gallium (Ga), niobium (Nb), tantalum (Ta) and tungsten (W). These replacement elements contribute to improvement of magnetic properties, for example, the coercive force. However, excessive replacement of Co with the element A may cause decrease in magnetization, and thus the amount of replacement with the element A is preferably in a range of 20 atomic % or less of Co.

The permanent magnet of the embodiment contains a slight amount of carbon (C). The slight amount of carbon is contained in the Sm—Co based magnet, and thereby, mechanical strength of the permanent magnet is improved. The content of carbon falls in a range of $0.002 \leq t \leq 0.03$ in the atomic ratio when the total amount of elements other than the element R (Fe, Co, Cu, M, C) is set to 1. When at value exceeds 0.03, an excessive amount of carbide precipitates, and the magnetization decreases significantly, in addition, the coercive force is difficult to be exerted due to decrease in the element M amount in the main phase. When the t value is less than 0.002, a precipitation amount of carbide is too small, and it becomes difficult to obtain the sufficient mechanical strength. The content of carbon is more preferably $0.003 \leq t \leq 0.02$, and still more preferably $0.004 \leq t \leq 0.01$. Note that it is permissible that the permanent magnet of the embodiment contains inevitable impurities such as an oxide.

The permanent magnet of the embodiment is preferably a sintered magnet formed of a sintered compact having a composition represented by the composition formula (1). In the Sm—Co based sintered magnet, a region including a $Th_2Zn_{17}$ crystal phase (2-17 phase) is held as a main phase. The main phase of the permanent magnet means a phase whose volume ratio is the largest in total constituent phases. The volume ratio of the main phase is preferably 70% or more, and more preferably 90% or more. An example of a scanning electron microscope (SEM) image of the Sm—Co based magnet of the embodiment is illustrated in FIG. 1. The Sm—Co based magnet includes a grain boundary phase which forms a crystal grain boundary, a sub phase of the element M (a phase which mainly contains carbide of element M), an oxide phase of the element R such as Sin, and a low melting point phase such as an $Sm_2Co_7$ phase, and so on as sub phases in addition to the main phase which is formed of crystal grains of an $Sm_2Co_{17}$ phase, as illustrated in FIG. 1.

It is possible to measure the composition of the permanent magnet by an ICP (inductively coupled plasma) emission spectrochemical analysis method, an SEM-EDX (scanning electron microscope-energy dispersive X-ray spectroscope) method, a TEM-EDX (transmission electron microscope-EDX) method, and so on. A volume ratio of each phase is comprehensively judged by using both observation by an electron microscope or an optical microscope, and by an X-ray diffraction or the like, further it can be found by an areal analysis method of an electron micrograph where a cross section of the permanent magnet is photographed. As the cross section of the permanent magnet, the cross section at substantially a center part of a surface with a maximum area of a sample is used.

In the permanent magnet of the embodiment, the main phase is a phase responsible for the magnetic properties, where a $TbCu_7$ crystal phase (1-7 phase) being a high temperature phase is set to a precursor, and a phase separation structure in nanoscale formed by performing an aging treatment on the precursor is held. The phase separation structure is made up of a cell phase formed by the $Th_2Zn_{17}$ crystal phase (2-17 phase), a cell wall phase formed by a $CaCu_5$ crystal phase (1-5 phase) or the like, and a platelet phase. A metallic structure after the phase separation has a secondary structure called as a cell structure. A magnetic domain wall energy of the cell wall phase is larger than that of the cell phase, and this difference in the magnetic domain wall energies becomes a barrier to magnetic domain wall displacement. In the Sm—Co based magnet, it is thought that the cell wall phase having the large magnetic domain wall energy acts as a pinning site, and thereby, the coercive force in a magnetic domain wall pinning type is exerted.

The cell wall phase is a phase existing in a plate shape at a boundary of the cell phase, and a width of the phase is approximately a few nm to 10 nm. It is thought that the difference in the magnetic domain wall energies between the cell phase and the cell wall phase is mainly generated due to a difference in Cu concentrations. It is thought that the coercive force is exerted when the Cu concentration of the cell wall phase is higher than the Cu concentration of the cell phase. In the permanent magnet of the embodiment, the Cu concentration of the cell wall phase is preferably twice or more as high as that of the cell phase. As a concrete example, the Cu concentration of the cell wall phase is approximately 20 atomic % in a sample where the Cu concentration of the cell phase is approximately 3 atomic %.

The platelet phase is a phase in a plate shape existing to cross over a plurality of crystal grains, and exists perpendicular to a c-axis direction of the cell phase. Accordingly, the platelet phases are observed in parallel with each other in one domain. An element M concentration of the platelet phase is preferably several times as high as that of the cell phase. As a concrete example, a Zr concentration of the platelet phase is approximately 4.5 atomic % in a sample where the Zr concentration of the cell phase is approximately 1.5 atomic %. It is thought that the platelet phase is responsible for a diffusion path of atoms when the phase separation structure is formed. The phase separation proceeds owing to the formation of the platelet phase. The platelet phase is rich in the element M, and therefore, it is important to control the element M concentration of the main phase to exert the coercive force of the Sm—Co based magnet.

Among the constituent phases of the Sm—Co based magnet, the grain boundary phase is a phase existing at a periphery of the crystal grains as the main phase, and is formed at a sintering time. It is a phase whose melting point is lower than the main phase. The grain boundary phase is mainly made up of an $Sm_2Co_7$ phase, an $SmCo_5$ phase, and so on. The low melting point phase such as the $Sm_2Co_7$ phase is formed by largely growing from the crystal grain boundary as illustrated in FIG. 1. There is a case when the low melting point phase forms a part of the metallic structure. The Cu concentration and the element M concentration of the low melting point phase tend to be higher than those of the main phase. The low melting point phase is made up of approximately the same elements as the main phase, but the concentrations of Cu and the element M are higher than the main phase, further it is a nonmagnetic phase. Accordingly, when a lot of low melting point phases are formed, the Cu concentration and the element M concentration of the main phase are lowered, and the coercive force and squareness of the Sm—Co based magnet decrease.

The sub phase of the element M is a phase which precipitates in the crystal grains of the main phase and the crystal grain boundary, and is formed mainly by the element M (particularly Zr) in the main phase reacting with carbon to precipitate. The sub phase of the element M contains the carbide of element M such as ZrC. The sub phase of the element M (hereinafter, also referred to as a phase containing M carbide.) precipitates in a granular state with a diameter of approximately 0.5 to 5 m. The phase containing the M carbide is practically made up of the element M and carbon, and the element M concentration is 30 atomic % or more. The phase containing the M carbide is also the nonmagnetic phase as same as the low melting point phase, and therefore, it is thought that decrease in magnetization is incurred by the precipitation thereof. Further, the lowering of the element M concentration in the main phase occurs at around the phase containing the M carbide, and therefore, the platelet phase is difficult to be formed. The diffusion paths of the elements in the main phase thereby decrease, and it is predicted that the cell structure is difficult to be formed, and the Cu concentration difference between the cell phase and the cell wall phase is difficult to occur. Accordingly, it is thought that the coercive force and the squareness of the Sm—Co based magnet are lowered. When the phase containing the M carbide precipitates, it is thought that lowering of the magnetic properties occurs at a region more than a volume of the phase containing the M carbide. Note that carbon and a carbide phase are components to improve the mechanical strength of the permanent magnet, and therefore, it is not preferable to completely eliminate carbon and the carbide phase.

As stated above, it is effective to replace a part of Co with Fe, and to increase the Fe concentration in order to increase the magnetization of the Sm—Co based magnet. In the Sm—Co based magnet of the embodiment, the Fe content is set in a range of 27 to 45 atomic % ($0.27 \leq p \leq 0.45$) relative to a total amount of elements other than the element R (Fe, Co, Cu, M, C). However, the coercive force of the Sm—Co based magnet tends to be difficult to be exerted at a composition region whose Fe concentration is high. Lowering of the coercive force becomes a factor to lower the $(BH)_{max}$ and the heat resistance of the Sm—Co based magnet. As a result of hard investigation on lowering causes of the coercive force as stated above, it was found that the phase containing the M carbide was easy to precipitate at the composition region with high Fe concentration. Further, it was found that the nonmagnetic phase containing the M carbide lowered the magnetic properties, in addition, the metallic structure enabling exertion of the coercive force, namely, the phase separation structure having the cell structure was difficult to be formed also in the main phase at a periphery of the phase containing the M carbide.

As a result of detailed investigation regarding a precipitation mode of the phases containing the M carbide, it was found that a region where the coercive force was difficult to be exerted could be substantially reduced by making the phases containing the M carbide segregated or coarsely precipitate without making the phases spatially uniformly precipitate. Surface areas of the phases containing the M carbide (precipitated grains) become smaller and an area which is in contact with the main phase decreases when the phases containing the M carbide exist by being segregated or coarsened compared to a case when they dispersedly exist in a fine state even if a precipitation amount of the phases containing the M carbide is the same. Namely, it is possible to narrow the region where the phase containing the M carbide affects on the element M concentration in the main phase. It is thereby possible to enable the Sm—Co based magnet with high Fe concentration to exert the coercive force of 1400 kA/m or more.

In the Sm—Co based magnet of the embodiment, a ratio of a circumferential length L to an area S (precipitated area) of the phase containing the M carbide (precipitated grains) which precipitates in a granularly state (hereinafter, denoted as an L/S ratio) is set in a range from 1 or more to 10 or less. The circumferential length L of the phase containing the M carbide represents a size of a region where the phase containing the M carbide is in contact with the main phase. The area S of the phase containing the M carbide represents a precipitation amount of the phase containing the M carbide. The ratio of the circumferential length L relative to the precipitated area S (L/S ratio) is 10 or less means that the region where the phase containing the M carbide is in contact with the main phase is small relative to the precipitation amount of the phase containing the M carbide. Accordingly, the ratio of the phase separation structure having the cell structure in the main phase increases, and the coercive force of the Sm—Co based magnet improves. The L/S ratio is preferably 10 or less, and more preferably 8 or less. Note that when the L/S ratio is less than 1, the amount of precipitation becomes too little, and a strength of the magnet is lowered. The L/S ratio is preferably 1 or more, and more preferably 2 or more.

Further, the phase containing the M carbide (precipitated grains) preferably exists two or more per a unit area (50 μm×50 μm) of the metallic structure of the Sm—Co based magnet. When the number of precipitates per the unit area of the phase containing the M carbide is less than two, it is impossible to enough obtain an effect to increase the mechanical strength of the magnet, in addition, there is a possibility that the above-stated L/S ratio cannot be satisfied. Note that when the number of precipitates per the unit area of the phase containing the M carbide is too large, the properties of the Sm—Co based magnet such as the coercive force are lowered because the area of the main phase relatively decreases. The number of precipitates of the phase containing the M carbide per the unit area is preferably 40 or less.

The phase containing the M carbide as described above is enabled, and thereby, it becomes possible that the large coercive force is exerted in the Sm—Co based magnet with high Fe concentration. Namely, it is possible to increase the ratio of the phase separation structure which enables to exert the coercive force in the Sm—Co based magnet where high magnetization is supplied based on the high Fe concentration. Accordingly, it is possible to provide the Sm—Co based magnet where the coercive force is improved while keeping high magnetization. Further, it is possible to improve the $(BH)_{max}$ value of the Sm—Co based magnet based on the magnetization and the coercive force as stated above. It thereby possible to provide the high performance Sm—Co based magnet.

The L/S ratio and the number of precipitates of the phase containing the M carbide are found as described below. A composition analysis of the constituent phases is performed by EDX regarding the SEM image of the sample. A continuous region whose element M concentration is 30 atomic % or more in the SEM image is certified as the phase containing the M carbide. Next, the phase containing the M carbide to be observed is approximated by a circle with a minimum radius where the phase enters therein (a circle where a boundary between the phase containing the M carbide and the other phases is in contact with a circumference thereof). The circumferential length L $(2\pi r_i)$ and the area S $(\pi(r_i)^2)$ of the phase containing the M carbide are calculated from a radius $(r_i)$ [unit: μm] of this circle. All of the circumferential lengths L $(2\pi r_i)$ and the areas S $(\pi(r_i)^2)$ of the phases containing the M carbide observed in the SEM image are found, and a ratio $(L_{total}/S_{total})$ between a total $L_{total}$ $(\Sigma 2\pi r_i)$ of the circumferential lengths L and a total $S_{total}$ $(\Sigma \pi(r_i)^2)$ of the areas S is found as the L/S ratio. Further, the number of precipitates of the phase containing the M carbide is found.

The SEM-EDX observation is performed as described below. At a center part of a longest side on a surface having a largest area of the sample, measurements are performed at surface parts and inner parts of a cross section taken perpendicular to the side (or perpendicular to a tangential line of the center part when it is a curved line). As positions of the measurement, there are provided a reference line 1 drawn perpendicular to a side and inward to an end part from a position of ½ of each side on the above-described cross section as a start point, and a reference line 2 drawn inward to an end part from a center of each corner as a start point at a position of ½ of an internal angle of the corner, and each position at 1% of the length of the reference line from the start point of each of these reference lines 1 and 2 is defined as the surface part and each position at 40% thereof is defined as the inner part. When the corner has a curvature by chamfering or the like, an intersecting point of extended adjacent sides is taken as an end part (center of the corner) of the side. The measurement position is a position not from the intersecting point but from a part which is in contact with the reference line.

By setting the measurement positions as above, when the cross section is a quadrangle for example, there are four reference lines 1 and four reference lines 2, eight reference lines in total, and there are eight measurement positions each at the surface part and the inner part. In this embodiment, it is preferable that all of the eight positions at each of the surface parts and the inner parts fall within the range of the L/S ratio, but at least four positions or more at each of the surface parts and the inner parts may fall within the above-stated range. In this case, a relation between the surface part and the inner part of one reference line is not defined. An observation surface defined thus is smoothed by polishing and then the SEM observation is performed at a magnification of 2500 times. An observation region (unit area) by the SEM is set to 50 μm×50 μm. An acceleration voltage is preferably set to 20 kV. The $L_{total}/S_{total}$ ratio is measured at each measurement position, an average value of values excluding a maximum value and a minimum value from these measurement values is found, and the average value is set to the L/S ratio. Further, the number of precipitates of the phase containing the M carbide existing per the unit area (50 μm×50 μm) of each measurement position is measured, an average value of values excluding a maximum value and a minimum value from these measurement values is found, and the average value is set to the number of precipitates.

Figure 2:
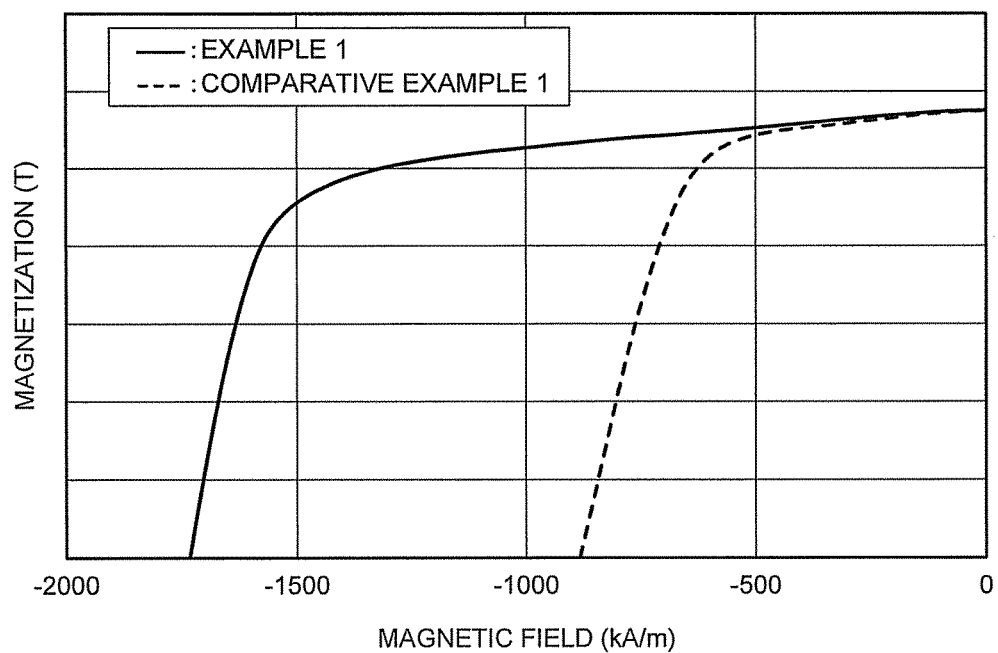
FIG. 2 is a view illustrating an example of a magnetization curve of the permanent magnet of the embodiment.

FIG. 2 is a view illustrating an example of a magnetization curve of the Sm—Co based magnet of the embodiment by comparing with a conventional Sm—Co based magnet. The Sm—Co based magnet of the embodiment and the Sm—Co based magnet of a comparative example illustrated in FIG. 2 each have the same composition, and include the main phase having the two-phase separation structure, the grain boundary phase, the phase containing the M carbide, and the oxide phase. Note that the L/S ratio of the phase containing the M carbide is 10 or less in the Sm—Co based magnet of the embodiment, but the L/S ratio exceeds 10 in the Sm—Co based magnet of the comparative example. As it is obvious from FIG. 2, it can be seen that the Sm—Co based magnet of the embodiment has the excellent coercive force and squareness while keeping the high magnetization.

A precipitation mode of the phase containing the M carbide changes depending on a raw material composition (a carbon amount, an element M amount, and so on contained in a raw material), and heat treatment conditions in a sintering treatment and a solution treatment. It is preferable to select the conditions described below to make the phase containing the M carbide segregated or coarsely precipitate. As for the raw material composition, it is preferable that a powder with high element M concentration and a power with low element M concentration are prepared, and both are mixed to obtain a desired composition. The powder with high element M concentration preferentially reacts with carbon, and therefore, the phase containing the M carbide is easy to be segregated or coarsely precipitate. As for the heat treatment conditions, it is effective to increase a sintering speed to fasten the reaction between the element M and carbon. Further, it is effective to make a sintering time and a solution time long, to enable to make the phase containing the M carbide easy to precipitate in the grain boundary by coarsening a crystal grain diameter of the main phase. Concrete conditions of the above are described later in detail.

The permanent magnet of the embodiment is produced as, for example, described below. At first, an alloy powder containing a predetermined amount of elements is produced. The alloy powder is prepared by grinding an alloy ingot obtained through casting of molten metal melted by an arc melting method or a high-frequency melting method. The alloy powder is able to have a desired composition by mixing a plurality of powders having different compositions. In particular, it is preferable to prepare the alloy powder having the desired composition by mixing powders with different element M concentrations. For example, when the element M concentration in a desired composition is 2.3 mass %, it is conceivable to mix a first allow powder with the element M concentration of 2.0 mass % and a second allow powder with the element M concentration of 3.0 mass %.

As other preparing methods of the alloy powder, there can be cited a mechanical alloying method, a mechanical grinding method, a gas atomization method, a reduction diffusion method, and the like. An alloy powder prepared by using these methods may be used. A strip cast method is used, and thereby, it is possible to improve uniformity of the alloy powder. A heat treatment may be performed according to need on the alloy powder obtained as stated above or the alloy before grinding to be homogenized. A jet mill, a ball mill and so on is used for grinding of flakes and ingots. The grinding is preferably performed in an inert gas atmosphere or an organic solvent in order to prevent oxidation of the alloy powder.

Next, the alloy powder is filled in a mold installed in an electromagnet or the like, and is press-formed while applying a magnetic field to thereby produce a green compact whose crystal axes are oriented. As a forming method, there are a dry method and a wet method. When it is dry-formed, a slight amount of lubricant is desirably added to improve fluidity and prevent oxidation of the powder. As the lubricant, there can be cited silicone oil, mineral oil, and so on. The green compact as stated above is sintered at the temperature of 1100 to 1300° C. for 1 to 15 hours to obtain a sintered compact with high density.

When the sintering temperature is less than 1100° C., a density of the sintered compact becomes insufficient. When the sintering temperature exceeds 1300° C., the rare-earth element such as Sm evaporates, and the good magnetic properties cannot be obtained. The sintering temperature is more preferably in a range of 1150 to 1250° C., and still more preferably in a range of 1180 to 1230° C. When the sintering time is less than 1 hour, there is a possibility that the density of the sintered compact becomes nonuniform. When the sintering time exceeds 15 hours, the rare-earth element such as Sm evaporates, and the good magnetic properties cannot be obtained. The sintering time is more preferably in a range of 1 to 10 hours, and still more preferably in a range of 1 to 7 hours. The sintering of the green compact is preferably performed in a vacuum or an inert gas atmosphere such as argon gas in order to prevent oxidation.

A rate of heating at the sintering time is preferably in a range of 5 to 25° C./min. The rate of heating at the sintering time is set to 5° C./min or more, and thereby, the reaction between the element M and carbon is accelerated, and the phase containing the M carbide is easy to be segregated or coarsely precipitate. When the rate of heating at the sintering time exceeds 25° C./min, there is a possibility that denseness of the sintered compact is damaged. The rate of heating at the sintering time is more preferably 10° C./min or more, and still more preferably 13° C./min or more. Besides, the rate of heating at the sintering time is more preferably 23° C./min or less, and still more preferably 20° C./min or less.

Next, the solution treatment and the aging treatment are performed on the obtained sintered compact to control a crystal structure. The solution treatment is preferably performed by retaining at the temperature in a range of 1110 to 1200° C. for 1 to 24 hours so as to obtain the 1-7 phase being the precursor of the phase separation structure. When the solution treatment temperature is less than 1110° C. or exceeds 1200° C., a ratio of the 1-7 phase in the sample after the solution treatment becomes small, and the good magnetic properties cannot be obtained. Besides, there is a possibility that a concentration distribution of each element in the 1-7 phase cannot be sufficiently uniformized. The solution treatment temperature is more preferably in a range of 1120 to 1190° C., and still more preferably in a range of 1130° C. to 1180° C.

When the solution treatment time is less than 1 hour, there is a possibility that the crystal grains of the main phase do not enough grow. Besides, the constituent phases are easy to be nonuniform, further there is a possibility that the concentration distribution of each element in the 1-7 phase cannot be sufficiently uniformized. When the solution treatment time exceeds 24 hours, there is a possibility that the rare-earth element such as Sm in the sintered compact evaporates, and the good magnetic properties cannot be obtained. The solution treatment time is more preferably in a range of 1 to 24 hours, and still more preferably in a range of 2 to 20 hours. The solution treatment is preferably performed in the vacuum or the inert gas atmosphere such as argon gas in order to prevent oxidation.

The aging treatment is preferably performed on the sintered compact after the solution treatment by retaining at the temperature of 700 to 900° C. for 10 to 100 hours, and thereafter slowly cooling to the temperature of 20 to 600° C. at a cooling rate of −0.1 to −5° C./min, subsequently cooling to a room temperature. The aging treatment is performed under the conditions as stated above, and thereby, it is possible to obtain the Sm—Co based magnet having the phase separation structure with good reproducibility. The aging treatment is preferably performed in the vacuum or the inert gas atmosphere such as argon gas in order to prevent oxidation.

When the aging treatment temperature is less than 700° C. or exceeds 900° C., there is a possibility that the homogeneous mixed structure of the cell phase and the cell wall phase cannot be obtained, and the magnetic properties of the permanent magnet are lowered. The aging treatment temperature is more preferably in a range of 750 to 880° C., and still more preferably in a range of 780° C. to 850° C. When the aging treatment time is less than 10 hours, there is a possibility that the precipitation of the cell wall phase from the 1-7 phase does not fully complete. When the aging treatment time exceeds 100 hours, there are possibilities that a thickness of the cell wall phase is thickened to lower a volume fraction of the cell phase, further the crystal grains are coarsened, and thereby, the good magnetic properties cannot be obtained. The aging treatment time is more preferably in a range of 10 to 90 hours, and still more preferably 20 to 80 hours.

When the cooling rate after the aging treatment is too late, there are possibilities that productivity of the permanent magnet is lowered, and cost increases. When the cooling rate after the aging treatment is too fast, there are possibilities that the homogeneous mixed structure of the cell phase and the cell wall phase cannot be obtained, and the magnetic properties of the permanent magnet are lowered. The cooling rate after the aging treatment is more preferably in a range of −0.3 to −4° C./min, and still more preferably in a range of −0.5 to −3° C./min.

A preliminary aging treatment may be performed prior to the above-stated aging treatment at a lower temperature than the aging treatment temperature. The preliminary aging treatment is preferably performed by retaining at the temperature of 500 to 900° C. for 0.5 to 10 hours, and thereafter, slowly cooling to the temperature of 20 to 450° C. at the cooling rate of −0.1 to −5° C./min. It is possible to improve the squareness of the permanent magnet by performing the preliminary aging treatment.

The permanent magnet of the embodiment can be used for various motors and generators. Further, it is also possible to use the permanent magnet as a stationary magnet or a variable magnet of a variable magnetic flux motor or a variable magnetic flux generator. Various motors and generators are formed by using the permanent magnet of the embodiment. When the permanent magnet of the embodiment is applied to the variable magnetic flux motor, technologies disclosed in Japanese Patent Application Laid-open No. 2008-29148 or Japanese Patent Application Laid-open No. 2008-43172 can be applied to a configuration and a drive system of the variable magnetic flux motor.

Figure 3:
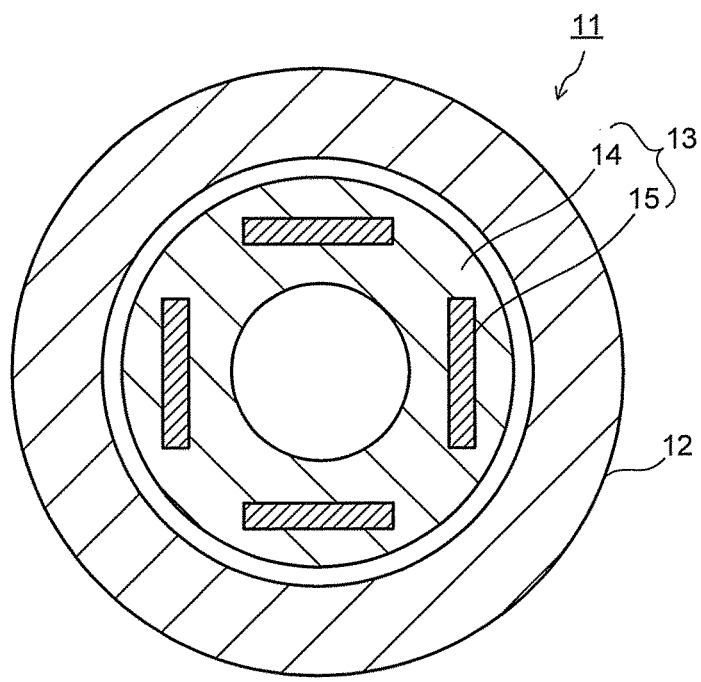
FIG. 3 is a view illustrating a permanent magnet motor of the embodiment.

Next, a motor and a generator of the embodiment will be described with reference to the drawings. FIG. 3 illustrates a permanent magnet motor according to the embodiment. In a permanent magnet motor 11 illustrated in FIG. 3, a rotor 13 is disposed in a stator 12. In an iron core 14 of the rotor 13, permanent magnets 15 of the embodiment are disposed. Based on properties and the like of the permanent magnet of the embodiment, high efficiency, small-sizing, cost reduction, and the like of the permanent magnet motor 11 can be achieved.

Figure 4:
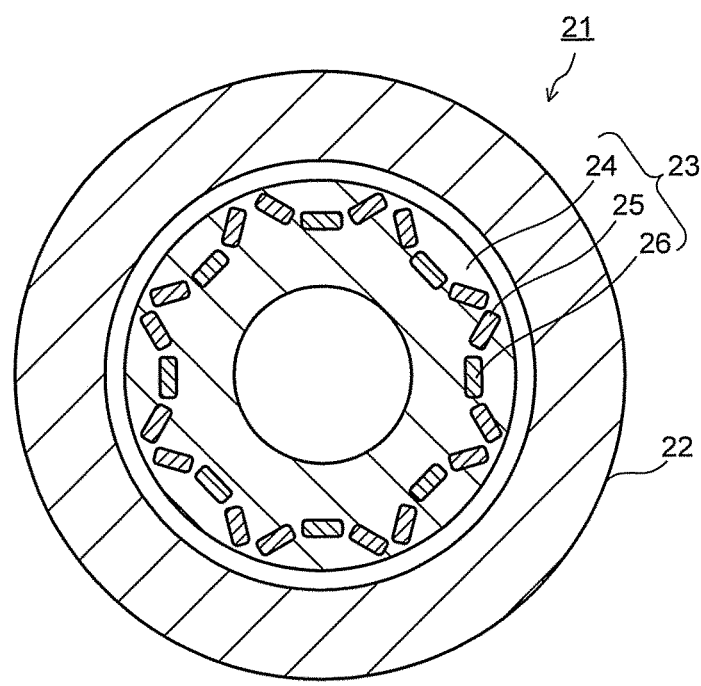
FIG. 4 is a view illustrating a variable magnetic flux motor of the embodiment.

FIG. 4 illustrates a variable magnetic flux motor of the embodiment. In a variable magnetic flux motor 21 illustrated in FIG. 4, a rotor 23 is disposed in a stator 22. In an iron core 24 of the rotor 23, the permanent magnets of the embodiment are disposed as stationary magnets 25 and variable magnets 26. The permanent magnet of the embodiment is suitable for the stationary magnet 25. A magnetic flux density (magnetic flux amount) of the variable magnet 26 is enabled to be variable. A magnetization direction of the variable magnet 26 is orthogonal to a Q-axis direction, and thus is not affected by a Q-axis current, and can be magnetized by a D-axis current. A magnetization winding (not illustrated) is provided on the rotor 23. It is structured such that by passing a current from a magnetization circuit through this magnetization winding, a magnetic field thereof operates directly on the variable magnet 26.

According to the permanent magnet of the embodiment, it is possible to obtain, for example, the stationary magnet 25 whose coercive force exceeds 500 kA/m and the variable magnet 26 whose coercive force is 500 kA/m or less by changing the above-stated various conditions of the manufacturing method. Note that in the variable magnetic flux motor 21 illustrated in FIG. 4, the permanent magnets of the embodiment can be used for both the stationary magnets 25 and the variable magnets 26, but the permanent magnets of the embodiment may be used for either one of the magnets. The variable magnetic flux motor 21 is capable of outputting a large torque from a small device size, and thus is preferred for a motor of a hybrid vehicle, electric vehicle, or the like required to have high output power and small size of the motor.

Figure 5:
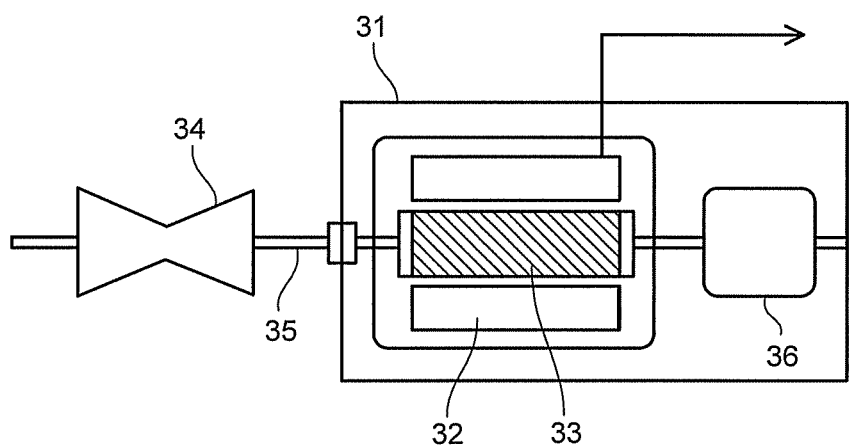
FIG. 5 is a view illustrating a permanent magnet generator of the embodiment.

FIG. 5 illustrates a generator according to the embodiment. A generator 31 illustrated in FIG. 5 includes a stator 32 using the permanent magnet of the embodiment. A rotor 33 disposed inside the stator 32 is coupled to a turbine 34 provided at one end of the generator 31 via a shaft 35. The turbine 34 is rotated by, for example, fluid supplied from the outside. Note that it is also possible to rotate the shaft 35 by, not the turbine 34 rotated by fluid, but a transmission of dynamic rotations of regenerative energy or the like of an automobile. Various publicly known configurations may be employed for the stator 32 and the rotor 33.

The shaft 35 is in contact with a commutator (not illustrated) disposed on an opposite side of the turbine 34 with respect to the rotor 33, and electromotive force generated by rotations of the rotor 33 is increased in voltage to a system voltage and transmitted as output of the generator 31 via isolated phase buses and a main transformer (not illustrated). The generator 31 may be either of an ordinary generator and a variable magnetic flux generator. Incidentally, static electricity from the turbine 34 or charges by an axial current accompanying power generation occur on the rotor 33. Accordingly, the generator 31 has a brush 36 for discharging the charges of the rotor 33.

Next, examples and evaluation results thereof will be described.

Example 1

After respective raw materials were weighed to have to have a composition of "$Sm(Fe_{0.31}Zr_{0.15}Cu_{0.05}Co_{bal.}Co_{0.01})_{7.5}$", they were high-frequency melted in the Ar gas atmosphere to produce an alloy ingot 1. Similarly, an alloy ingot 2 having a composition of "$Sm(Fe_{0.31}Zr_{0.027}Cu_{0.05}Co_{bal.}C_{0.01})_{7.5}$" was produced. Respective alloy ingots were coarsely ground and further pulverized with the jet mill, to thereby prepare an alloy powder 1 and an alloy powder 2 each with an average particle size of 4 μm. These alloy powder 1 and alloy powder 2 were weighed to have to have a composition illustrated in Table 1, further were poured into a rotary stirrer to be mixed. The obtained mixed powder was press-molded in a magnetic field of 1.5 T at a press pressure of 2 t to produce a green compact.

Next, the green compact of the mixed powder was placed in a chamber of a firing furnace, sintering was performed by increasing the temperature to 1200° C. in the Ar gas atmosphere at the rate of heating of 10° C./min, and retaining at that temperature for 3 hours, subsequently the solution treatment was performed by retaining at 1170° C. for 10 hours. The sintered compact after the solution treatment was retained in the Ar gas atmosphere at 830° C. for 20 hours, and thereafter, it was slowly cooled to 300° C. at the cooling rate of −0.7° C./min, further was furnace-cooled to the room temperature to obtain an objected sintered magnet. A composition of the sintered magnet was as illustrated in Table 1. The obtained sintered magnet was supplied to a later-described property evaluation.

Example 2

After respective raw materials were weighed to have to have a composition as illustrated in Table 1, they were high-frequency melted in the Ar gas atmosphere to produce an alloy ingot. The alloy ingot was coarsely ground and further pulverized with the jet mill, to thereby prepare an alloy powder with the average particle size of 4 μm. The alloy powder was press-molded in the magnetic field of 1.5 T at the press pressure of 2 t to produce a green compact. Next, the green compact was placed in the chamber of the firing furnace, sintering was performed by increasing the temperature to 1200° C. in the Ar gas atmosphere at the rate of heating of 20° C./min, and retaining at that temperature for 5 hours, subsequently the solution treatment was performed by retaining at 1170° C. for 20 hours. The sintered compact after the solution treatment was retained in the Ar gas atmosphere at 830° C. for 20 hours, and thereafter, it was slowly cooled to 300° C. at the cooling rate of −0.7° C./min, further was furnace-cooled to the room temperature to obtain an objected sintered magnet. The obtained sintered magnet was supplied to the later-described property evaluation.

Examples 3 to 6

Sintered magnets were produced as same as the example 2 except that the compositions illustrated in Table 1 were each applied. The obtained sintered magnets were supplied to the later-described property evaluation.

Example 7

After respective raw materials were weighed to have to have a composition as illustrated in Table 1, they were high-frequency melted in the Ar gas atmosphere to produce an alloy ingot. The alloy ingot was heat treated in the Ar gas atmosphere at 1170° C. for 1 hour, and thereafter, it was coarsely ground, and further pulverized with the ball mill, to thereby prepare an alloy powder with the average particle size of 3 μm. The alloy powder was press-molded in the magnetic field of 1.5 T at the press pressure of 1 t to produce a green compact. Next, the green compact was placed in the chamber of the firing furnace, and sintering was performed by increasing the temperature to 1190° C. in the Ar gas atmosphere at the rate of heating of 13° C./min, and retaining at that temperature for 3 hours, subsequently the solution treatment was performed by retaining at 1150° C. for 15 hours. The sintered compact after the solution treatment was retained in the Ar gas atmosphere at 800° C. for 30 hours, and thereafter, it was slowly cooled to 300° C. at the cooling rate of −1.0° C./min, further was furnace-cooled to the room temperature to obtain an objected sintered magnet. The obtained sintered magnet was supplied to the later-described property evaluation.

Example 8

After respective raw materials were weighed to have to have a composition of "$(Sm_{0.8}Nd_{0.2})(Fe_{0.32}Zr_{0.014}Cu_{0.05}Co_{bal.}C_{0.015})_{7.5}$", they were high-frequency melted in the Ar gas atmosphere to produce an alloy ingot 1. Similarly, an alloy ingot 2 having a composition of "$(Sm_{0.8}Nd_{0.2})(Fe_{0.32}Zr_{0.025}Cu_{0.05}Co_{bal.}C_{0.015})_{7.5}$" was produced. Respective alloy ingots were heat treated in the Ar gas atmosphere at 1170° C. for 1 hour, and thereafter, were coarsely ground, and further pulverized with the ball mill, to thereby prepare the alloy powder 1 and the alloy powder 2 each with the average particle size of 3 μm. These alloy powder 1 and alloy powder 2 were weighed to have to have the composition illustrated in Table 1, further were poured into the rotary stirrer to be mixed. The obtained mixed powder was press-molded in the magnetic field of 1.5 T at the press pressure of 1 t to produce a green compact.

Next, the green compact of the mixed powder was placed in the chamber of the firing furnace, sintering was performed by increasing the temperature to 1190° C. in the Ar gas atmosphere at the rate of heating of 13° C./min, and retaining at that temperature for 3 hours, subsequently the solution treatment was performed by retaining at 1150° C. for 15 hours. The sintered compact after the solution treatment was retained in the Ar gas atmosphere at 800° C. for 30 hours, and thereafter, was slowly cooled to 300° C. at the cooling rate of −1.0° C./min, further was furnace-cooled to the room temperature to obtain an objected sintered magnet. The obtained sintered magnet was supplied to the later-described property evaluation.

Example 9

After respective raw materials were weighed to have to have a composition of "$Sm(Fe_{0.32}(Zr_{0.9}Ti_{0.1})_{0.015}Cu_{0.06}Co_{bal.}C_{0.02})_{7.3}$", they were high-frequency melted in the Ar gas atmosphere to produce an alloy ingot 1. The alloy ingot 1 was charged in a quartz nozzle, was melted by high-frequency induction heating, and thereafter, the molten metal was poured in a chill roll rotating at a peripheral speed of 0.6 m/sec, was continuously solidified to prepare an alloy thin strip. The alloy thin strip was coarsely ground and further pulverized with the jet mill, to thereby prepare the alloy powder 1 with the average particle size of 4 m. Similarly, an alloy ingot 2 having a composition of "$Sm(Fe_{0.32}(Zr_{0.9}Ti_{0.1})_{0.022}Cu_{0.06}Co_{bal.}C_{0.02})_{7.3}$" with the average particle size of 4 μm was produced. These alloy powder 1 and alloy powder 2 were weighed to have to have the composition illustrated in Table 1, further were poured into the rotary stirrer to be mixed. The obtained mixed powder was press-molded in the magnetic field of 1.5 T at the press pressure of 1 t to produce a green compact.

Next, the green compact of the mixed powder was placed in the chamber of the firing furnace, sintering was performed by increasing the temperature to 1200° C. in the Air gas atmosphere at the rate of heating of 13° C./min, and retaining at that temperature for 1 hour, subsequently the solution treatment was performed by retaining at 1170° C. for 10 hours. The heat treatment was performed on the sintered compact after the solution treatment under a condition of 750° C.×2 hours as a first aging treatment, and thereafter, it was slowly cooled to 200° C. at the cooling rate of −1.5° C./min. Subsequently, the heat treatment was performed under a condition of 850° C.×10 hours as a second aging treatment, and thereafter, it was slowly cooled to 600° C. at the cooling rate of −1.0° C./min, further was furnace-cooled to the room temperature to obtain an objected sintered magnet. The obtained sintered magnet was supplied to the later-described property evaluation.

Example 10

After respective raw materials were weighed to have to have a composition as illustrated in Table 1, they were high-frequency melted in the Ar gas atmosphere to produce an alloy ingot. The alloy ingot was charged in the quartz nozzle, was melted by high-frequency induction heating, and thereafter, the molten metal was poured into the chill roll rotating at the peripheral speed of 0.6 m/sec, was continuously solidified to prepare an alloy thin strip. The alloy thin strip was coarsely ground and further pulverized with the jet mill, to thereby prepare the alloy powder with the average particle size of 4 μm. The obtained alloy powder was press-molded in the magnetic field of 1.5 T at the press pressure of 1 t to produce a green compact.

Next, the green compact of the mixed powder was placed in the chamber of the firing furnace, sintering was performed by increasing the temperature to 1200° C. in the Ar gas atmosphere at the rate of heating of 13° C./min, and retaining at that temperature for 1 hour, subsequently the solution treatment was performed by retaining at 1170° C. for 10 hours. The heat treatment was performed on the sintered compact after the solution treatment under the condition of 750° C.×2 hours as the first aging treatment, and thereafter, it was slowly cooled to 200° C. at the cooling rate of −1.5° C./min. Subsequently, the heat treatment was performed under the condition of 850° C.×10 hours as the second aging treatment, and thereafter, it was slowly cooled to 600° C. at the cooling rate of −1.0° C./min, further was furnace-cooled to the room temperature to obtain an objected sintered magnet. A composition of the sintered magnet was as illustrated in Table 1. The obtained sintered magnet was supplied to the later-described property evaluation.

Comparative Example 1

After respective raw materials were weighed to have to have the same composition as the magnet of the example 1, they were high-frequency melted in the Ar gas atmosphere to produce an alloy ingot. The alloy ingot was coarsely ground, and further pulverized with the jet mill, to thereby prepare an alloy powder with the average particle size of 4

μm. A green compact was produced as same as the example 1 by using the single alloy powder as stated above. Next, the green compact was placed in the chamber of the firing furnace, sintering was performed by increasing the temperature to 1200° C. in the Ar gas atmosphere at the rate of heating of 1° C./min, and retaining at that temperature for 1 hour, subsequently the solution treatment was performed by retaining at 1170° C. for 0.5 hours. The sintered compact after the solution treatment was retained in the Ar gas atmosphere at 830° C. for 20 hours, and thereafter, was slowly cooled to 300° C. at the cooling rate of −0.7° C./min, further was furnace-cooled to the room temperature to obtain an objected sintered magnet. The obtained sintered magnet was supplied to the later-described property evaluation.

Comparative Example 2

A green compact was produced as same as the example 2 by using the alloy powder having the same composition as the example 2. Next, the green compact was placed in the chamber of the firing furnace, sintering was performed by increasing the temperature to 1200° C. in the Ar gas atmosphere at the rate of heating of 1° C./min, and retaining at that temperature for 15 hour, subsequently the solution treatment was performed by retaining at 1170° C. for 5 hours. The sintered compact after the solution treatment was retained in the Ar gas atmosphere at 830° C. for 20 hours, and thereafter, was slowly cooled to 300° C. at the cooling rate of −0.7° C./min, further was furnace-cooled to the room temperature to obtain an objected sintered magnet. The obtained sintered magnet was supplied to the later-described property evaluation.

Comparative Example 3

A sintered magnet was produced as same as the example 2 except that the composition illustrated in Table 1 was applied. A carbon content of the sintered magnet of a comparative example 3 was larger than the examples.

TABLE 1

| | Magnet Composition (atomic ratio) |
|---|---|
| Example 1 | $Sm(Fe_{0.31}Zr_{0.020}Cu_{0.05}Co_{bal.}C_{0.01})_{7.5}$ |
| Example 2 | $Sm(Fe_{0.32}Zr_{0.019}Cu_{0.045}Co_{bal.}C_{0.02})_{7.4}$ |
| Example 3 | $Sm(Fe_{0.34}Zr_{0.019}Cu_{0.05}Co_{bal.}C_{0.01})_{7.7}$ |
| Example 4 | $Sm(Fe_{0.31}Zr_{0.019}Cu_{0.06}Co_{bal.}C_{0.015})_{8.1}$ |
| Example 5 | $Sm(Fe_{0.31}Zr_{0.021}Cu_{0.05}Co_{bal.}C_{0.01})_{8.5}$ |
| Example 6 | $Sm(Fe_{0.33}Zr_{0.018}Cu_{0.05}Co_{bal.}C_{0.01})_{7.0}$ |
| Example 7 | $Sm(Fe_{0.34}(Zr_{0.7}Ti_{0.2}Hf_{0.1})_{0.02}Cu_{0.06}Co_{bal.}C_{0.02})_{7.4}$ |
| Example 8 | $(Sm_{0.8}Nd_{0.2})(Fe_{0.32}Zr_{0.02}Cu_{0.05}Co_{bal.}C_{0.015})_{7.5}$ |
| Example 9 | $Sm(Fe_{0.32}(Zr_{0.9}Ti_{0.1})_{0.018}Cu_{0.06}Co_{bal.}C_{0.02})_{7.3}$ |
| Example 10 | $(Sm_{0.8}Pr_{0.2})(Fe_{0.33}(Zr_{0.8}Ti_{0.2})_{0.022}Cu_{0.06}Co_{bal.}C_{0.03})_{7.6}$ |
| Comparative Example 1 | $Sm(Fe_{0.31}Zr_{0.020}Cu_{0.05}Co_{bal.}C_{0.01})_{7.5}$ |
| Comparative Example 2 | $Sm(Fe_{0.32}Zr_{0.019}Cu_{0.045}Co_{bal.}C_{0.02})_{7.4}$ |
| Comparative Example 3 | $Sm(Fe_{0.32}Zr_{0.019}Cu_{0.045}Co_{bal.}C_{0.05})_{7.4}$ |

As a result of observation of the metallic structures of the sintered magnets of the above-stated examples 1 to 10 and comparative examples 1 to 3 by the SEM, it was verified that all of the metallic structures have the main phase, the grain boundary phase, the c phase, and the oxide phase. The L/S ratio of the phase containing the M carbide in each of the sintered magnets (sintered compacts) was found according to the above-stated method. Further the number of precipitates of the phase containing the M carbide per a unit area was measured. These results are illustrated in Table 2. Next, the magnetic properties of each sintered magnet were evaluated by a BH tracer, and a residual magnetization and the coercive force were measured. These results are illustrated in Table 2.

TABLE 2

| | Phase containing M carbide | | Residual magnetization [T] | Coercive force [kA/m] |
|---|---|---|---|---|
| | L/S ratio | Number of precipitates | | |
| Example 1 | 7.6 | 15 | 1.17 | 1700 |
| Example 2 | 7.7 | 18 | 1.19 | 1600 |
| Example 3 | 6.7 | 20 | 1.20 | 1600 |
| Example 4 | 7.3 | 17 | 1.18 | 1500 |
| Example 5 | 9.2 | 22 | 1.17 | 1700 |
| Example 6 | 8.1 | 23 | 1.19 | 1700 |
| Example 7 | 7.5 | 15 | 1.23 | 1400 |
| Example 8 | 6.4 | 18 | 1.22 | 1500 |
| Example 9 | 5.9 | 16 | 1.18 | 1400 |
| Example 10 | 4.1 | 22 | 1.24 | 1400 |
| Comparative Example 1 | 15 | 18 | 1.17 | 800 |
| Comparative Example 2 | 20 | 20 | 1.19 | 600 |
| Comparative Example 3 | 12 | 55 | 1.12 | 200 |

As is apparent from Table 2, it was verified that in each of the sintered magnets of the examples 1 to 10, the coercive force of 1400 kA/m or more was held in addition to the high residual magnetization. On the other hand, each of the sintered magnets of the comparative examples 1 to 3 has a large L/S ratio, the phase containing the M carbide (Zr carbide or the like) was finely diffused and precipitated in crystal grains, and therefore, the sufficient coercive force could not be obtained. Further, in the sintered magnet of the comparative example 3, the carbon content was too much, and therefore, the phase containing the M carbide (Zr carbide or the like) excessively precipitated, and therefore, the residual magnetization was lowered, and the sufficient coercive force could not be obtained. All of the magnets of the examples and the comparative examples each had the two-phase separation structure, and included the phase containing the M carbide. Note that when the carbon content is less than the range defined in the embodiment, the precipitation amount of carbide becomes too little, resulting in that sufficient mechanical strength is difficult to be obtained, and is insufficient for practical use.

While certain embodiments have been described, these embodiments have been presented by way of example only, and are not intended to limit the scope of the inventions. Indeed, the novel methods described herein may be embodied in a variety of other forms; furthermore, various omissions, substitutions and changes in the form of the methods described herein may be made without departing from the spirit of the inventions. The accompanying claims and their equivalents are intended to cover such forms or modifications as would fall within the scope and sprit of the inventions.

What is claimed is:

1. A permanent magnet comprising:
a composition represented by a composition formula:

$$R(Fe_p M_q Cu_r C_t Co_{1-p-q-r-t})_z$$

wherein R is at least one element selected from the group consisting of rare-earth elements, M is at least one element selected from the group consisting of Ti, Zr and Hf, p is a number, which is an atomic ratio, satisfying $0.27 \leq p \leq 0.45$, q is a number, which is an atomic ratio, satisfying $0.01 \leq q \leq 0.05$, r is a number, which is an atomic ratio, satisfying $0.01 \leq r \leq 0.1$, t is a number, which is an atomic ratio, satisfying $0.002 \leq t \leq 0.03$, and z is a number, which is an atomic ratio, satisfying $6 \leq r \leq 9$; and
a metallic structure including a main phase containing a $Th_2Zn_{17}$ crystal phase, and a sub phase of the element M having an element M concentration of 30 atomic % or more and containing carbide of element M,
wherein the sub phase precipitates in the metallic structure, and a ratio of a circumferential length to a precipitated area of the sub phase is 2 or more and 9.2 or less, and a number of precipitates per a unit area, which is 50 mm×50 mm, of the sub phase is two or more.

2. The permanent magnet according to claim 1, comprising a sintered compact including the composition and the metallic structure,
wherein the sub phase precipitates in at least one of crystal grains or a crystal grain boundary forming the sintered compact.

3. The permanent magnet according to claim 2,
wherein the sintered compact is obtained by heating-up a green compact of magnetic ally powder to a sintering temperature of 1100° C. or more and 1300° C. or more at a rate of 10° C./min or more and 25° C./min or less, and sintering at the sintering temperature.

4. The permanent magnet according to claim 1,
wherein the main phase includes a cell phase having the $Th_2Zn_{17}$ crystal phase, a cell wall phase existing to surround the cell phase, and a platelet phase.

5. The permanent magnet according to claim 1,
wherein 50 atomic % or more of the element M in the composition formula is Zr.

6. The permanent magnet according to claim 1,
wherein 50 atomic % or more of the element R in the composition formula is Sm.

7. A motor comprising the permanent magnet according to claim 1.

8. A vehicle comprising the motor according to claim 7.

9. A generator comprising the permanent magnet according to claim 1.

10. A vehicle comprising the generator according to claim 9.

11. The permanent magnet according to claim 1,
wherein the ratio of the circumferential length to the precipitated area of the sub phase is 4.1 or more and 9.2 or less.

12. The permanent magnet according to claim 1,
wherein a number of precipitates per a unit area, which is 50 mm×50 mm, of the sub phase is 2 or more and 40 or less.

13. A permanent magnet comprising:
a composition represented by a composition formula:

$$R(Fe_p M_q Cu_r C_t (Co_{100-a} A_a)_{1-p-q-r-t})_z$$

wherein R is at least one element selected from the group consisting of rare-earth elements, M is at least one element selected from the group consisting of Ti, Zr and Hf, A is at least one element selected from the group consisting of Ni, V, Cr, Mn, Al, Si, Ga, Nb, Ta, and W, p is a number, which is an atomic ratio, satisfying $0.27 \leq p \leq 0.45$, q is a number, which is an atomic ratio, satisfying $0.01 \leq q \leq 0.05$, r is a number, which is an atomic ratio, satisfying $0.01 \leq r \leq 0.1$, t is a number, which is an atomic ratio, satisfying $0.002 \leq t \leq 0.03$, z is a number, which is an atomic ratio, satisfying $6 \leq r \leq 9$, and a is 20 atomic % or less; and
a metallic structure including a main phase containing a Th2Zn17 crystal phase, and a sub phase of the element M having an element M concentration of 30 atomic % or more and containing carbide of element M,
wherein the sub phase precipitates in the metallic structure, and a ratio of a circumferential length to a precipitated area of the sub phase is 2 or more and 9.2 or less, and a number of precipitates per a unit area, which is 50 mm×50 mm, of the sub phase is two or more.

* * * * *